US010697221B2

(12) United States Patent
Townson et al.

(10) Patent No.: US 10,697,221 B2
(45) Date of Patent: Jun. 30, 2020

(54) VARIABLE OUTPUT TORQUE ROD SYSTEM FOR PANEL COUNTERBALANCE

(71) Applicant: GM GLOBAL TECHNOLOGY OPERATIONS LLC, Detroit, MI (US)

(72) Inventors: James M. Townson, Clarkston, MI (US); Douglas P. Gonsler, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 34 days.

(21) Appl. No.: 16/142,226

(22) Filed: Sep. 26, 2018

(65) Prior Publication Data

US 2020/0095816 A1   Mar. 26, 2020

(51) Int. Cl.
*E05F 1/12* (2006.01)
*B62D 33/027* (2006.01)
*E05F 1/10* (2006.01)
*B62D 33/03* (2006.01)

(52) U.S. Cl.
CPC ........ *E05F 1/1238* (2013.01); *B62D 33/0273* (2013.01); *B62D 33/03* (2013.01); *E05F 1/1033* (2013.01); *E05Y 2201/486* (2013.01); *E05Y 2900/516* (2013.01); *E05Y 2900/546* (2013.01); *F16F 2234/02* (2013.01); *F16F 2236/08* (2013.01)

(58) Field of Classification Search
CPC ............... B62D 33/023; B62D 33/027; B62D 33/0273; B62D 33/03; E05F 1/123; E05F 1/1238; F16F 1/145
USPC ................................... 296/56, 57.1
See application file for complete search history.

(56) References Cited

U.S. PATENT DOCUMENTS

| 7,281,746 | B2 * | 10/2007 | Austin ................ | B60P 1/267 296/50 |
| 8,540,305 | B2 | 9/2013 | Schulte et al. | |
| 10,246,920 | B2 * | 4/2019 | Sytek ................ | E05F 1/1238 |

FOREIGN PATENT DOCUMENTS

FR        2874861 A1 *  3/2006   ......... B60G 21/0558

* cited by examiner

*Primary Examiner* — Jason S Daniels

(57) ABSTRACT

A variable output torque rod system for panel counterbalance includes a torque rod having a first fixed end relative to a storage area and a second fixed end relative to a panel, wherein the torque rod is configured to store energy by being twisted when the panel is pivoted in a first direction relative to the storage area and release the stored energy when the panel is pivoted in a second direction that is opposite to the first direction. A slider block is disposed on the torque rod between the first fixed end and the second fixed end wherein the slider block is free to be moved along an axis of the torque rod when a set screw is loosened from the torque rod, and wherein the slider block profiles against a portion of the panel to prevent rotation about the torque rod when the set screw is tightened.

7 Claims, 6 Drawing Sheets

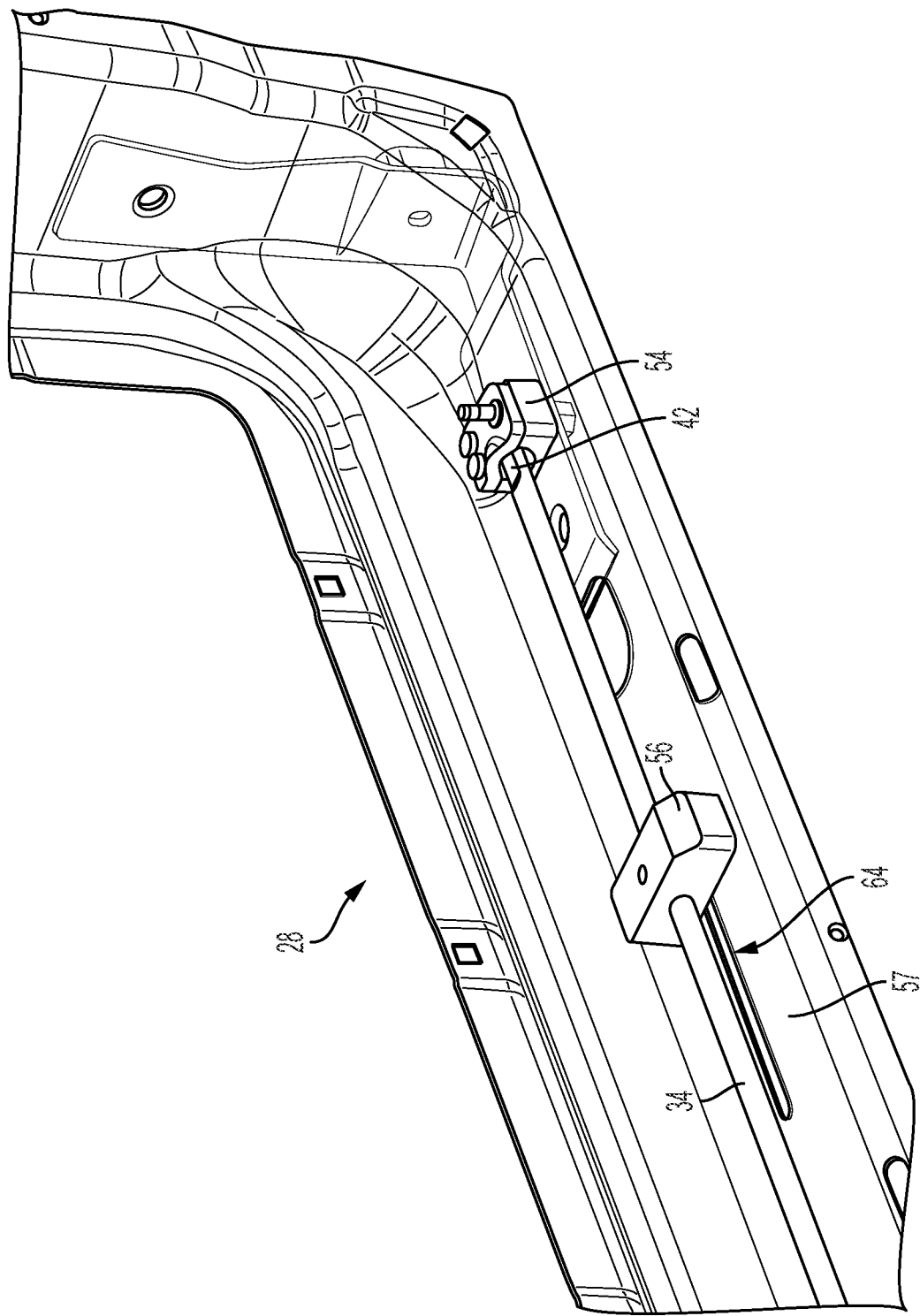

VARIABLE OUTPUT TORQUE ROD SYSTEM FOR PANEL COUNTERBALANCE

TECHNICAL FIELD

The present invention relates generally to vehicle end gate assemblies, and more specifically to a variable output torque rod system for panel counterbalance.

BACKGROUND OF THE INVENTION

Many conventional motor vehicles, such as the modern day pickup truck, are equipped with a pivotable end gate that closes off the end of a rear storage area. The traditional end gate (more commonly known as a "tailgate") is a door assembly extending transversely across the width of a rear portion of the vehicle. The end gate is normally hinged to the vehicle body at opposing side edges, near the bottom of the door assembly. The end gate is often mounted to two rear pillars between body side-panels that cooperatively form a vehicle storage area, such as the bed or box of a pickup truck or the rear cargo compartment of a sport utility vehicle (SUV). The end gate is operable to be unlatched, and swung from a vertical, closed position to a horizontal, open position that is approximately coplanar with an interior floor surface of the vehicle storage area.

Some end gate assemblies include a counterbalancing hinge assembly for assisting movement of the tailgate during opening and closing thereof. Different hinges can be used to produce various desired hinging characteristics. Torque (or torsion) rods have been used within prior art hinge devices to aid in hinging the end gate to the vehicle body. Deflection of the torque rod is used to counterbalance the weight of the end gate to aid in the opening and closing thereof. Specifically, the torque rod reduces the effort required to raise and lower the tailgate by storing energy in the twisting of the torque rod during opening/lowering from the residual kinetic energy generated by the tailgate.

Added mass from an end gate storage module and mass from stowed objects adversely effects the counterbalance by increasing initial and peak closing efforts and damped opening performance. Thus, there is a desire to have a counterbalance mechanism to compensate for additional mass storage in the end gate storage module.

SUMMARY OF THE INVENTION

According to one embodiment of the present invention, aspects of a variable output torque rod system for panel counterbalance include a storage area including a plurality of side walls and a floor, and a panel operatively connected to one of the floor and at least one of the plurality of side walls, and wherein the panel configured to expand or restrict access to the storage area. Another aspect in accordance with an exemplary embodiment includes a torque rod having a first fixed end relative to the storage area and a second fixed end relative to the panel, wherein the torque rod is configured to store energy by being twisted when the panel is pivoted in a first direction relative to the storage area and to release the stored energy when the panel is pivoted in a second direction that is opposite to the first direction to thereby assist operation of the panel. And yet another aspect includes a slider block disposed on the torque rod between the first fixed end and the second fixed end wherein the slider block is free to be moved along an axis of the torque rod when a set screw is loosened from the torque rod, and wherein the slider block profiles against a portion of the panel to prevent rotation about the torque rod when the set screw is tightened.

A further aspect of the exemplary embodiment is provided wherein the slider block is adjustable to shorten an effective length of the torque rod to increase the amount of stored energy that can be achieved when the torque rod is twisted when moving the panel in the first direction. And another aspect wherein the panel further includes a support flange having a slot that allows for adjustment of the slider block along the axis of the torque rod when the set screw is loosened. And still another aspect of an alternative embodiment wherein the panel includes a slot formed below and parallel to the longitudinal axis of the torque rod, and wherein the set screw of the slider block is exposed on a bottom surface of the panel such that the slider block is movable along the slot and torque rod when the set screw is loosened.

Still further aspects are provided wherein the panel is a pickup end gate, and wherein the pickup end gate is configured as a storage module. And one other aspect wherein the slider block is adjusted to effectively shorten the torque rod to increase the stored energy when the objects are stowed in the storage module and the pickup end gate is pivoted in the first direction.

The above features and advantages, and other features and advantages of the present invention, will be readily apparent from the following detailed description of the preferred embodiments and best modes for carrying out the invention when taken in connection with the accompanying drawings and appended claims.

BRIEF DESCRIPTION OF THE DRAWINGS

FIG. 4A is an illustration of a top view of an alternative embodiment of the variable output torque rod system.

DETAILED DESCRIPTION OF THE PREFERRED EMBODIMENTS

Figure 1:
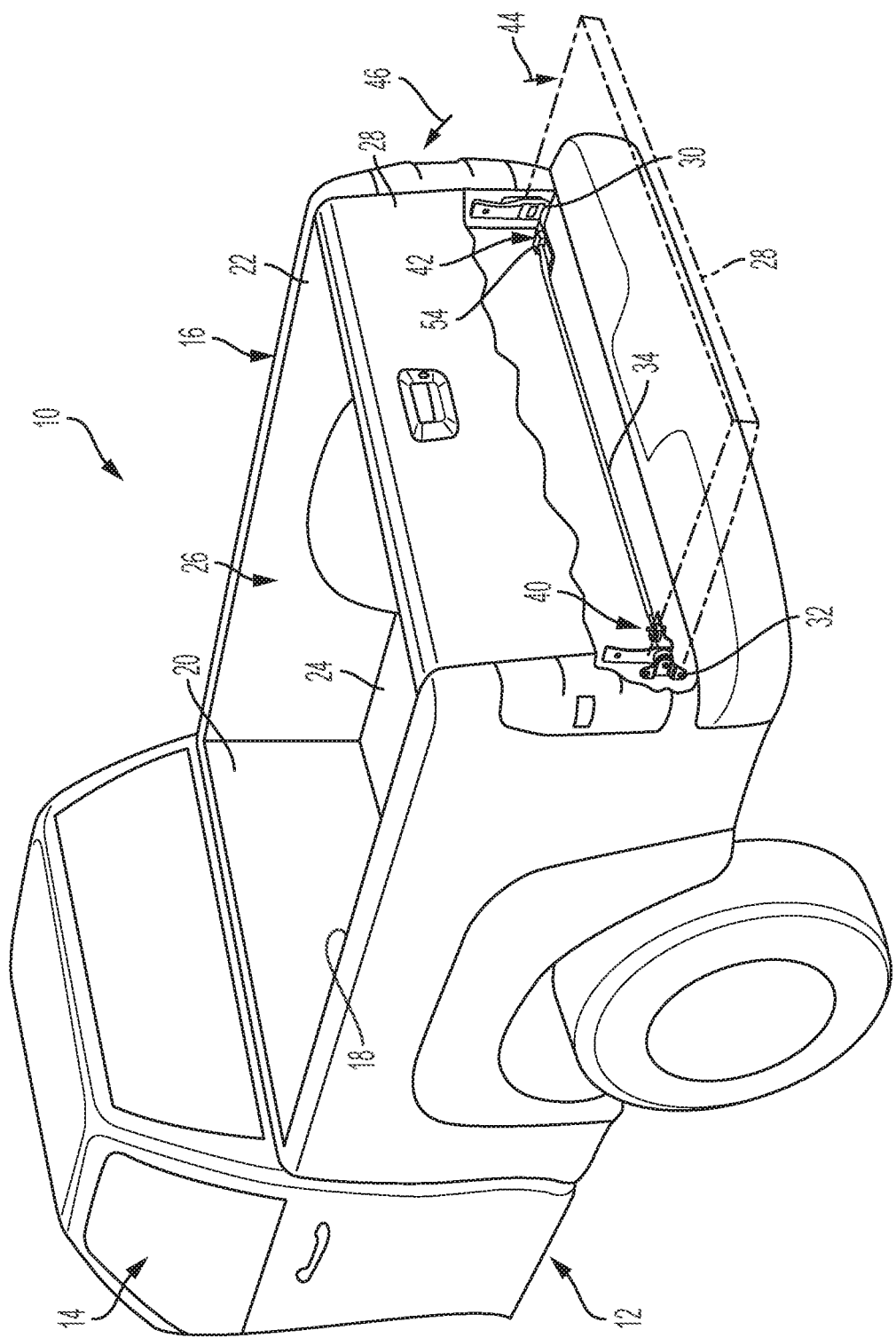
FIG. 1 is a cut-away rear perspective view of a vehicle having a storage compartment that includes a pivotable panel and a torque rod providing an assist force during operation of the panel, wherein the compartment is configured as a pick-up truck bed and the panel is configured as a tailgate.

Referring to the drawings, wherein like reference numbers refer to like components throughout the several views, Referring to the drawings, wherein like reference numbers refer to like components, FIG. 1 shows a vehicle 10 depicted as a pick-up truck. The vehicle 10 includes a vehicle body 12. The vehicle body 12 defines a passenger compartment 14 and a storage compartment 16. As shown in FIG. 1, the storage compartment 16 is configured as a bed of a pick-up truck and is generally adapted to carry bulky cargo.

The storage compartment 16 of FIG. 1 is enclosed on four sides but, as shown, may be arranged without a top cover, and therefore remain unrestricted from above. The storage compartment 16 includes a plurality of generally vertical perimeter walls, shown as a side wall 18, a side wall 20, and a side wall 22. The storage compartment 16 also includes a floor 24. The side walls 18, 20, 22, and the floor 24 are together configured to define a storage area 26. The storage compartment 16 also includes a panel 28.

As shown in FIG. 1, the panel 28 is configured in one possible embodiment as an end gate that is pivotably connected to the side walls 18 and 22 via bearing flanges 30 and 32, respectively. Each of the flanges 30, 32 may be fastened to the respective walls 18, 22 via any appropriate fastener(s), such as a pair of screws (not shown). Alternatively, the panel 28 may also be pivotably connected to the floor 24 via an appropriate hinge mechanism (not shown). Accordingly, when pivoted, the panel 28 selectively expands and restricts access to the storage area 26.

The panel 28 additionally includes a torque rod 34. The torque rod 34 is characterized by a cross-section having an outer diameter 35, a wall thickness 36, and a hollow interior 38. Alternatively, the torque rod 34 may be formed having a completely solid body segment. The torque rod 34 also has a first end 40 fixed relative to the side wall 18 of the storage area 26, a second end 42 fixed relative to the panel 28, and a predetermined length 43 that spans the distance between the first end 40 and the second end 42. The torque rod 34 is configured to store energy by being twisted when the panel 28 is pivoted in a first direction relative to the storage area 26, wherein the first direction is identified by an arrow 44. The torque rod 34 is formed from a suitable material that is capable of elastically withstanding torsion without taking a permanent set while being worked during operation of the panel 28, for example spring steel.

The torque rod 34 is also configured to release the stored energy when the panel 28 is pivoted in a second direction after being previously twisted in the first direction 44, wherein the second direction is identified by an arrow 46. As may be seen from FIG. 1, the second direction 46 is opposite to the first direction 44. Accordingly, the release of the stored energy by the torque rod 34 when the panel 28 is pivoted in the second direction 46 provides a force assist for the operation of the panel.

Figure 2:
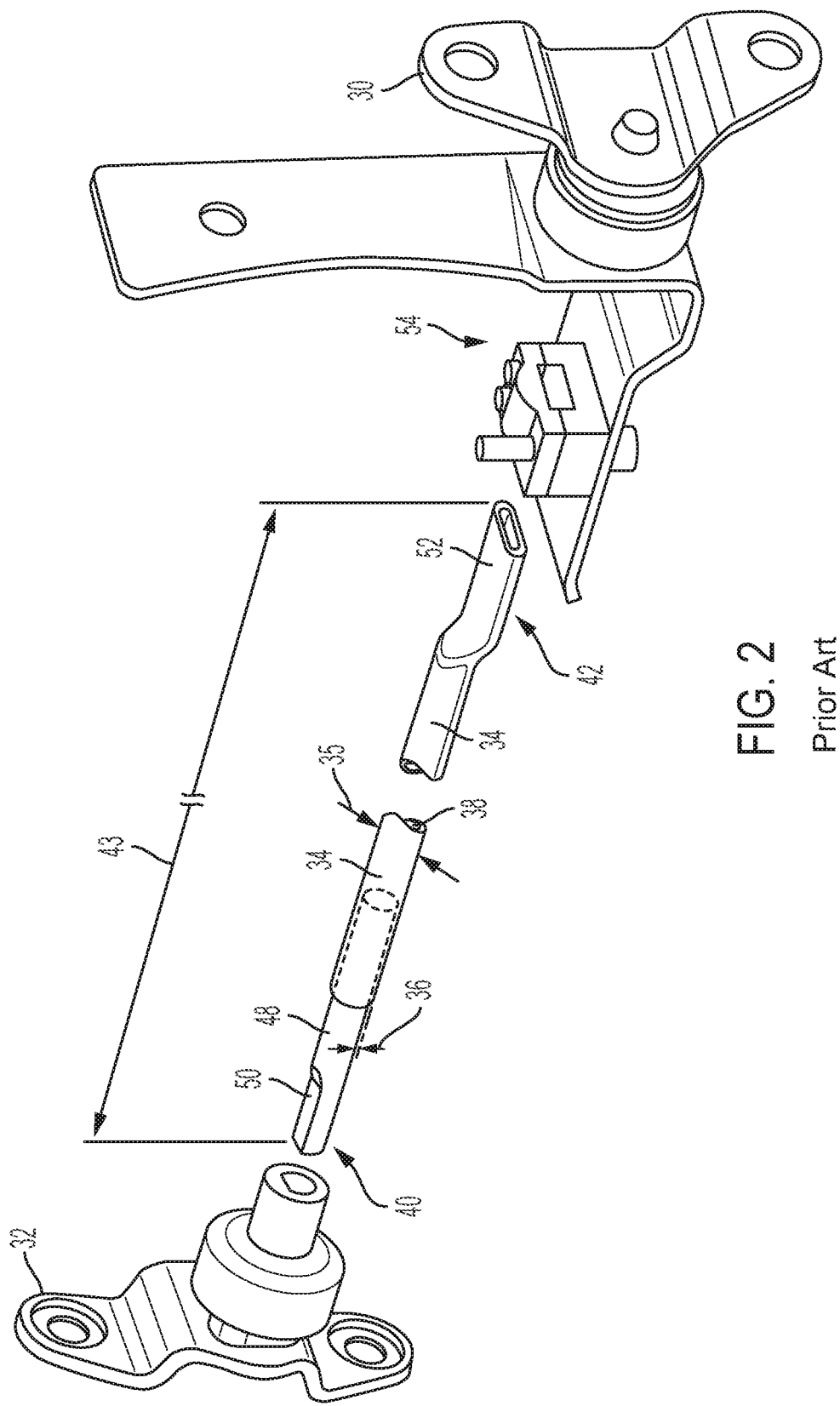
FIG. 2 is a detailed close-up partially exploded perspective view of the torque rod shown in FIG. 1.

In order to achieve the desired force to assist the operation of the panel 28, each of the first end 40 and the second end 42 is specifically configured in order to fix the first end relative to the storage area 26 and second end relative to the panel 28. As shown in FIG. 2, the first end 40 may include a solid segment 48 with a keyed section 50, wherein the solid segment is fixed inside the hollow interior 38. The solid segment 48 may first be inserted into the hollow interior 38, and then be either pressed or welded therein. The first end 40 is then fixed to the bearing flange 32 via the keyed section 50, such that the flange 32 effectively becomes part of the first end. As additionally shown in FIG. 2, the second end 42 of the torque rod 34 may include a compressed, substantially flat section 52. The substantially flat section 52 may then be clamped to a portion of the panel 28 via a fastening device 54, thus restricting movement of the second end 42 relative to the panel. Furthermore, each of the first and second ends 40 and 42 may include either the solid segment 48 with a keyed section 50 or the compressed, substantially flat section 52 fixed inside the hollow interior 38 depending on the retention requirements of each end.

When the panel 28 is pivoted in the first direction 44 from the position where access to the storage area 26 is restricted, the torque rod 34 is twisted because while the first end 40 is securely tied to the side wall 18, the second end 42 is rotated with the panel. The action of operating the panel 28 to expand the storage area 26 stores energy in the torque rod 34 under the mass of the panel 28 being lowered in the first direction 44. Conversely, when then panel 28 is operated in the second direction 46 to restrict access to the storage area 26, the torque rod 34 is permitted to release the stored energy and thus assist with raising the panel 28. The overall diameter 35, the wall thickness 36, and the length 43 are all selected to provide the torque rod 34 with a desired spring rate such that the twisting of the torque rod may generate a useful force assist in raising the panel 28.

Figure 3A:
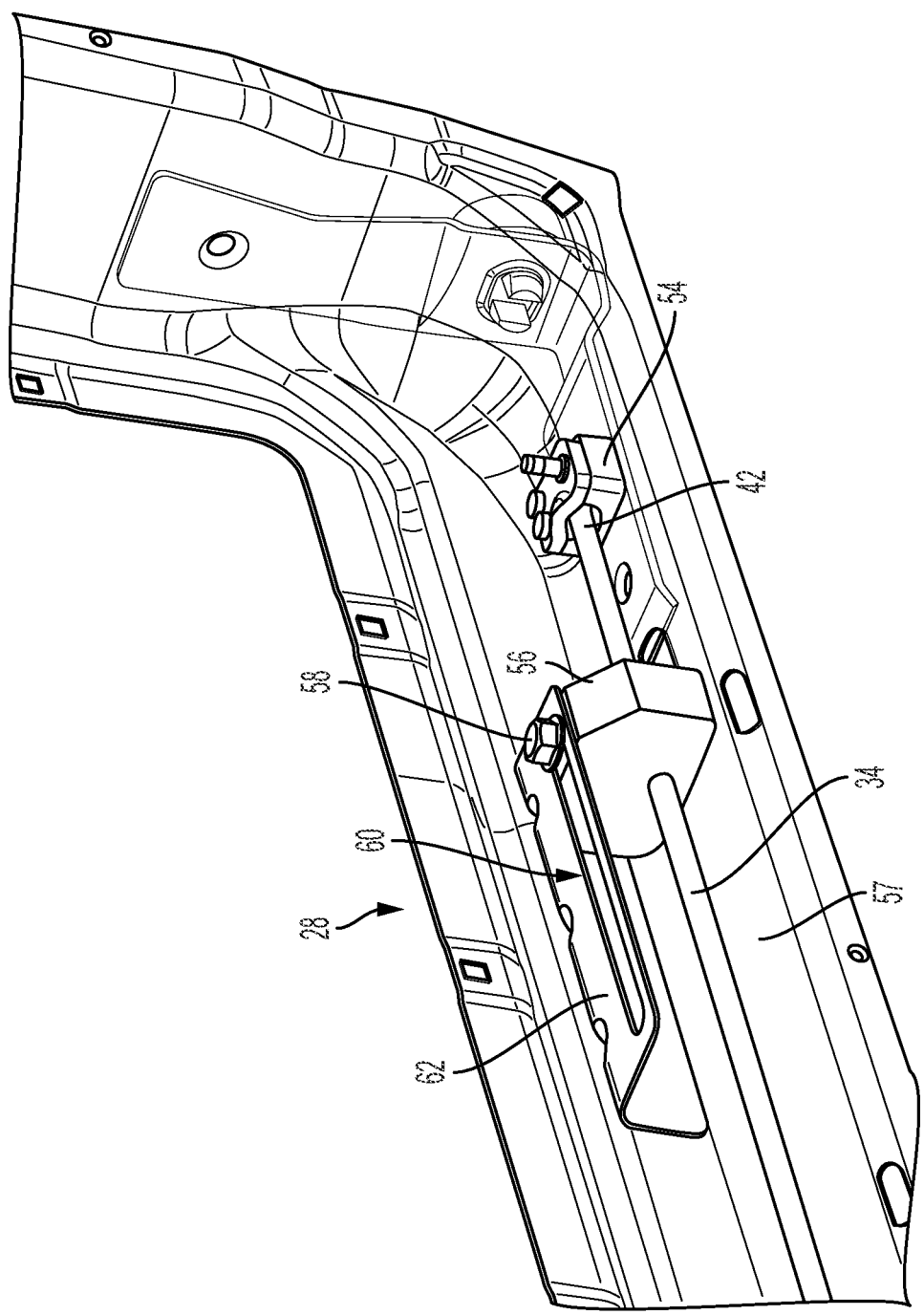
FIG. 3A is an illustration of a partial view of a variable output torque rod system for panel counterbalance in accordance with aspects of an exemplary embodiment.
Figure 3B:
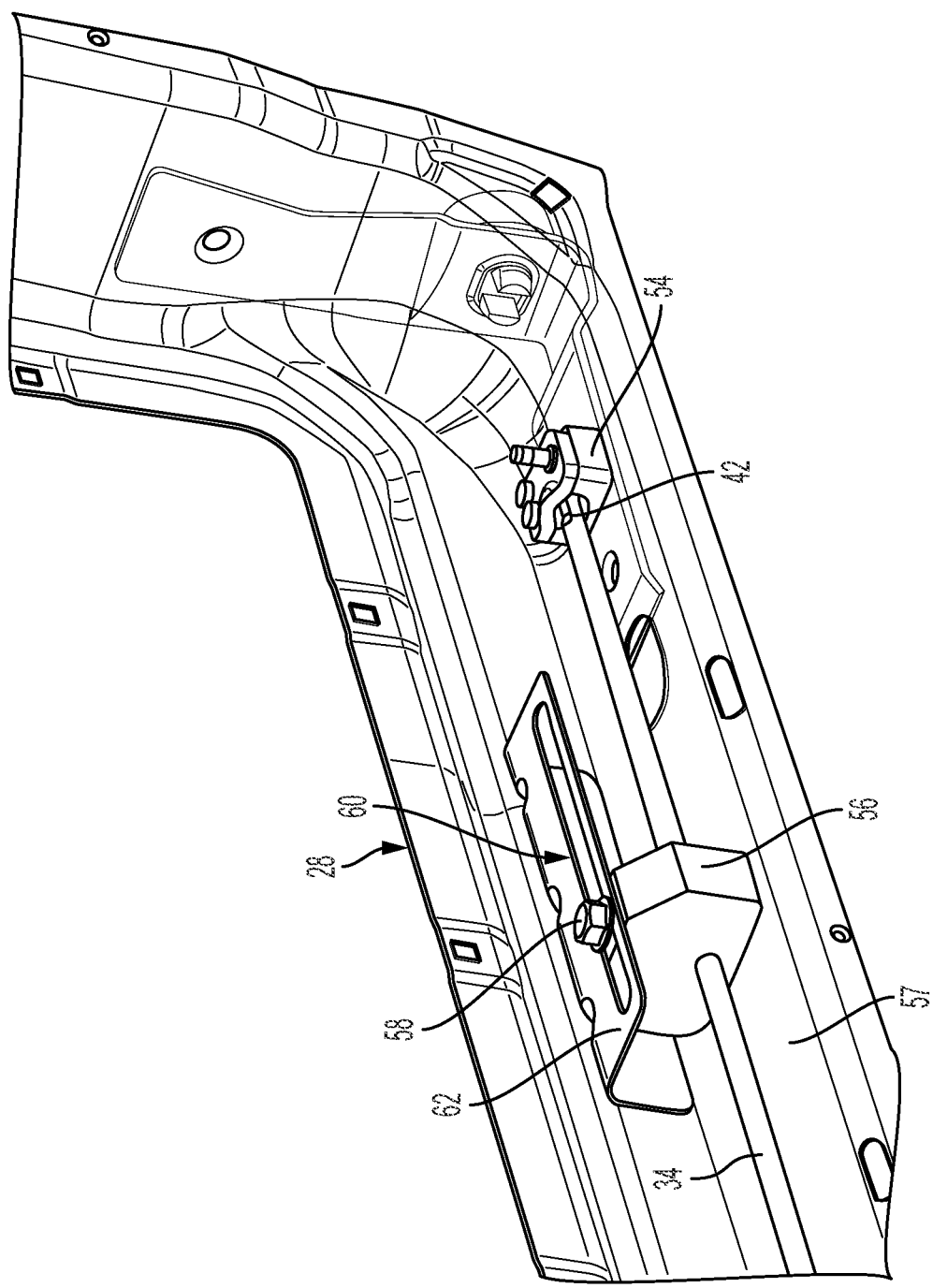
FIG. 3B is an illustration of the variable output torque rod system for panel counterbalance of FIG. 1 after adjustment to effectively shorten the torque rod in accordance with aspects of an exemplary embodiment.

FIGS. 3A and 3B illustrate a variable output torque system for panel counterbalance in accordance with aspects of an exemplary embodiment. The variable output torque is accomplished by adjusting the position of a slider block 56 along the predetermined length 43 of the torque rod 34. The slider block 56 profiles against a portion 57 of the panel 28 to prevent its rotation about the torque rod 34 when a set screw 58 is tightened onto the torque rod 34. The slider block 56 is free to slide along a portion of the torque rod 34 when the set screw 58 is loosened allowing the slider block 56 to be moved along a slot 60 formed in a support flange 62 disposed in the panel 28 as illustrated in FIG. 3B. Adjusting the position of the slider block 56 along the slot 60 of the support flange 62 provides a mechanism for shortening the effective length of the torque rod 34 which operates to increase the amount of stored energy that can be achieved when the torque rod 34 is twisted when moving the panel 28 in the first direction 44. In accordance with the below Equation 1, the torque or stored energy in the torque rod can be increased by increasing the torque rod diameter, increasing the twist angle of the torque rod, increasing the material strength of the torque rod, or shortening the length of the torque rod.

$$T=(G\Theta/L)*J, \quad \text{Equation 1}$$

wherein T=applied external torque;
G=material strength;
Θ=twist angle;
J=polar moment of inertia;
L=torque rod length It is contemplated that the panel 28 can provide additional utility as a storage module for stowing objects such as tools and/or construction materials. The added weight of the stowed objects adversely effects the counterbalance of the panel 28 by increasing initial and peak closing efforts and damped opening performance. In accordance with aspects of the exemplary embodiment, the stored energy potential of the torque rod 34 can be increased by effectively shortening the length of the torque rod 34 when the slider block 56 is properly adjusted with the slot 60 of the support flange 62 (FIG. 3B). Thus, the slider block 56 and torque rod 34 system provides a mechanism for compensating for the adverse effects on the panel 28 counterbalance capabilities when the panel 28 is used as a storage module.

Figure 4B:
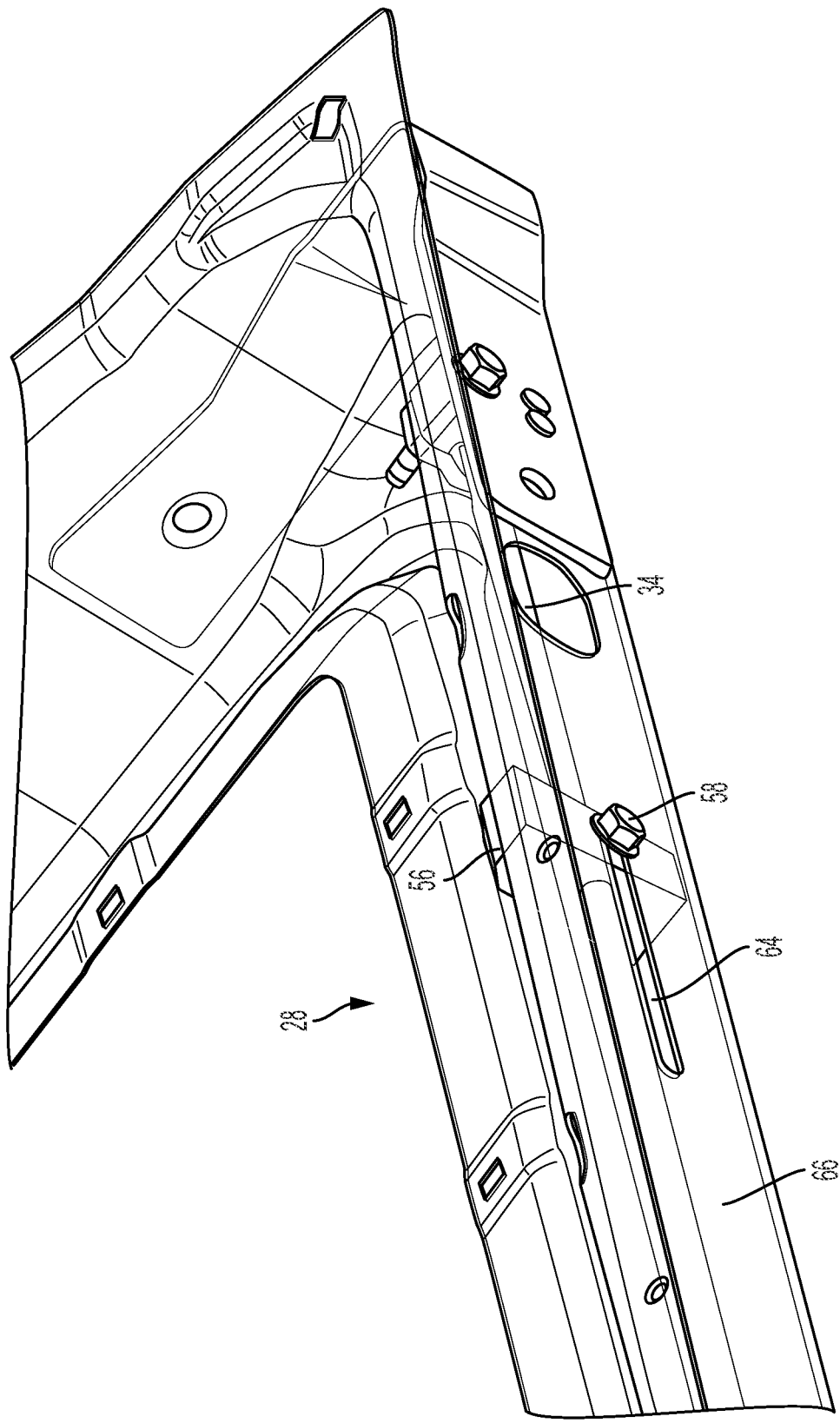
FIG. 4B is an illustration of bottom view of the alternative embodiment of FIG. 4A.

FIGS. 4A and 4B illustrate an alternative embodiment for a variable output torque system for panel counterbalance. This embodiment allows for the slider block 56 position to be adjusted by accessing the set screw 58 when the panel 28 is moved to the vertical position such that the storage area 26 is closed. The panel 28 is formed to include a slot 64 below and parallel to the longitudinal axis of the torque rod 34. As illustrated in FIG. 4B, the set screw 58 of the slider block 56 is exposed on the bottom surface 66 of the panel 28 such that the slider block 56 is movable along the slot 64 and torque rod 34 when the set screw 58 is loosened. In this configuration, the length of the torque rod 34 can be easily varied to increase its potential stored energy by effectively shortening the overall length through adjustment of the slider block 56.

While the best modes for carrying out the invention have been described in detail, those familiar with the art to which this invention relates will recognize various alternative designs and embodiments for practicing the invention within the scope of the appended claims.

What is claimed is:

1. A variable output torque rod system for panel counterbalance comprising:
    a storage area including a plurality of side walls and a floor;
    a panel operatively connected to one of the floor and at least one of the plurality of side walls, and configured to expand or restrict access to the storage area;
    a torque rod having a first fixed end relative to the storage area and a second fixed end relative to the panel, wherein the torque rod is configured to store energy by being twisted when the panel is pivoted in a first direction relative to the storage area and to release the stored energy when the panel is pivoted in a second direction that is opposite to the first direction to thereby assist operation of the panel; and
    a slider block disposed on the torque rod between the first fixed end and the second fixed end wherein the slider block is free to be moved along an axis of the torque rod when a set screw is loosened from the torque rod, and wherein the slider block profiles against a portion of the panel to prevent rotation about the torque rod when the set screw is tightened.

2. The system of claim 1 wherein the slider block is adjustable to shorten an effective length of the torque rod to increase the amount of stored energy that can be achieved when the torque rod is twisted when moving the panel in the first direction.

3. The system of claim 1 wherein the panel further comprises a support flange having a slot that allows for adjustment of the slider block along the axis of the torque rod when the set screw is loosened.

4. The system of claim 1 wherein the panel includes a slot formed below and parallel to the longitudinal axis of the torque rod, and wherein the set screw of the slider block is exposed on a bottom surface of the panel such that the slider block is movable along the slot and torque rod when the set screw is loosened.

5. The system of claim 1 wherein the panel is a pickup end gate.

6. The system of claim 5 wherein the pickup end gate is configured as a storage module.

7. The system of claim 6 wherein the slider block is adjusted to effectively shorten the torque rod to increase the stored energy when the objects are stowed in the storage module and the pickup end gate is pivoted in the first direction.

* * * * *